(12) United States Patent
Liu et al.

(10) Patent No.: US 8,619,811 B2
(45) Date of Patent: Dec. 31, 2013

(54) APPARATUS, SYSTEM AND METHOD FOR FORWARDING USER PLANE DATA

(75) Inventors: Heyang Liu, Guangdong (CN); Meifeng Zhang, Guangdong (CN); Chenggang Li, Guangdong (CN); Haishu Zheng, Guangdong (CN); Yajun Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 84 days.

(21) Appl. No.: 13/259,816

(22) PCT Filed: May 18, 2010

(86) PCT No.: PCT/CN2010/072891
§ 371 (c)(1),
(2), (4) Date: Dec. 21, 2011

(87) PCT Pub. No.: WO2010/145382
PCT Pub. Date: Dec. 23, 2010

(65) Prior Publication Data
US 2012/0093048 A1    Apr. 19, 2012

(30) Foreign Application Priority Data
Jun. 30, 2009    (CN) .......................... 2009 1 0158452

(51) Int. Cl.
*H04J 3/16* (2006.01)
*H04W 4/00* (2009.01)

(52) U.S. Cl.
USPC .......................................... 370/466; 370/328

(58) Field of Classification Search
None
See application file for complete search history.

(56) References Cited

U.S. PATENT DOCUMENTS

| 6,535,927 B1 | 3/2003 | Kim |
| 6,711,167 B1 | 3/2004 | Ikeda et al. |
| 2004/0009773 A1* | 1/2004 | Kato ............................ 455/445 |

(Continued)

FOREIGN PATENT DOCUMENTS

| CN | 1236240 A | 11/1999 |
| CN | 1236927 A | 12/1999 |

(Continued)

OTHER PUBLICATIONS

International Search Report dated Sep. 2, 2010 for PCT/CN2010/072891, filed May 18, 2010.

(Continued)

*Primary Examiner* — Clemence Han
(74) *Attorney, Agent, or Firm* — Knobbe, Martens, Olson & Bear, LLP (57) ABSTRACT

An apparatus, system and method for forwarding user plane data. A user plane gateway (102) comprises: a receiving module (106) for receiving data which comes from a first network element (100) and uses a first transfer module; a converting module (108) for converting the transfer mode of the received data from the first transfer mode to a second transfer mode, wherein the first transfer mode is asynchronous transfer mode (ATM) and the second transfer mode is Internet Protocol (IP) transfer mode, or the first transfer mode is IP transfer mode and the second transfer mode is ATM; and a sending module (110) for sending the converted data to a second network element (104) using the second transfer mode. This apparatus, system and method achieve the effects that the aggregation of ATM network to the IP network, the networking device able to be compatible forwardly, improving bandwidth utilization rate, saving costs, etc.

6 Claims, 6 Drawing Sheets

(56) References Cited

U.S. PATENT DOCUMENTS

| | | | |
|---|---|---|---|
| 2004/0043793 A1* | 3/2004 | Sakata | 455/560 |
| 2006/0159121 A1* | 7/2006 | Sakata et al. | 370/466 |
| 2007/0259667 A1* | 11/2007 | Kim et al. | 455/440 |
| 2009/0196233 A1* | 8/2009 | Zhu et al. | 370/328 |

FOREIGN PATENT DOCUMENTS

| | | |
|---|---|---|
| CN | 1848824 A | 10/2006 |
| CN | 1996967 A | 7/2007 |
| CN | 101594640 A | 12/2009 |

OTHER PUBLICATIONS

International Preliminary Report on Patentability and Written Opinion dated Jan. 4, 2012 for PCT/CN2010/072891, filed May 18, 2010.

Chinese Search Report for Chinese Application No. 200910158452.1 completed on Feb. 24, 2011 in 5 pages.

* cited by examiner

APPARATUS, SYSTEM AND METHOD FOR FORWARDING USER PLANE DATA

FIELD OF THE INVENTION

The present invention relates to the communication field, and in particular, to an apparatus, system and method for forwarding user plane data.

BACKGROUND OF THE INVENTION

With the development of network communication technology and the evolution of 3rd Generation Partnership Project (3GPP), asynchronous transfer mode (ATM) network will gradually join Internet Protocol (IP) network, and even will be replaced by the IP network. However, since resources will be wasted when replacing the currently available ATM network with the IP network and at the same time it still lacks practical networking and operating experience to use all-IP technology (in particular as to the IUB interface, wherein the IUB interface is an interface between the radio network controller (RNC) and base station node B (Node B) defined in 3GPP), the evolution of ATM network to IP network is gradual. Thus, the network elements which need to communicate may not directly communicate with each other due to different transfer modes, for example, the currently available NodeB devices use ATM transfer mode while RNC uses IP transfer mode.

Furthermore, the universal mobile telecommunications system (UMTS) introduces high speed downlink packet access (HSDPA) and high speed uplink packet access (HSUPA) services in the 3GPP R5 version, and the bandwidth requirements of the IUB interface increase a lot as compared to that of 3GPP R99/R4. If the Node B and RNC still use the point-to-point connection mode via the IUB interface, then on one hand, it will cause the links between the RNC and a plurality of Nodes B to be independent from each other and not be able to be multiplexed or shared. When the services of one certain Node B are relatively less, the transfer resources of the Node B and the RNC are wasted. Due to the introduction of HSDPA and HSUPA services, the wasted bandwidth can be up to tens of megabytes. On the other hand, if the point-to-point networking mode is used, it will be required to rent or deploy a network with a low speed link, the total fee of which is however far higher than that of a high speed link with the same bandwidth.

In addition, in 3GPP 25.933, access link control application protocol (ALCAP) over IP is recommended as the carrier control protocol of universal mobile telecommunication system radio access network (UTRAN), and in the SIGTRAN protocol suite of rfc, there is also provided a control plane gateway for converting the No. 7 signaling to the IP signaling. However, there is no such gateway in the user plane to cooperate with the control plane gateway to form a complete gateway.

It can be known from the above that in the current relevant art if the transfer modes of the network elements which need to communicate with each other are different, then they are unable to communicate with each other directly, thus it makes the networking devices which use IP transfer mode unable to be compatible forwardly with those networking devices which use ATM transfer mode.

SUMMARY OF THE INVENTION

The present invention is proposed to aim at the problem that the networking devices which have IP transfer mode are incapable of being forwardly compatible with the networking device which have ATM transfer mode. For this end, the main aspect of the present invention is to provide an apparatus, system and method for forwarding user plane data so as to solve at least one of the above problems.

A user plane gateway is provided according to one aspect of the present invention.

The user plane gateway according to the present invention comprises: a receiving module for receiving data which comes from a first network element and using a first transfer mode; a converting module for converting the transfer mode of the data from the first transfer mode to a second transfer mode, wherein the first transfer mode is asynchronous transfer mode and the second transfer mode is IP transfer mode, or the first transfer mode is IP transfer mode and the second transfer mode is asynchronous transfer mode; and a sending module for sending the converted data to a second network element using the second transfer mode.

Preferably, a link between a network element using the asynchronous transfer mode and the user plane gateway is a low speed link, and a link between the user plane gateway and a network element using the IP transfer mode is a high speed link.

Preferably, the network element using the asynchronous transfer mode is node B, and the network element using the IP transfer mode is a radio network controller.

Preferably, the network element using the asynchronous transfer mode is a radio network controller, and the network element using the IP transfer mode is a Serving GPRS Support Node (SGSN).

A system for forwarding user plane data is provided according to one aspect of the present invention.

The system for forwarding user plane data according to the present invention is applied in the universal mobile telecommunications system network, and the system comprises a first network element and a second network element, wherein the first network element uses a first transfer mode and the second network element uses a second transfer mode. In addition, the system for forwarding user plane data according to the present invention further comprises a user plane gateway, wherein the user plane gateway comprises: a receiving module for receiving data from the first network element; a converting module for converting the transfer mode of the data from the first transfer mode to the second transfer mode, wherein the first transfer mode is asynchronous transfer mode and the second transfer mode is IP transfer mode; or the first transfer mode is IP transfer mode and the second transfer mode is asynchronous transfer mode; and a sending module for sending the converted data to the second network element.

Preferably, a link between a network element using the asynchronous transfer mode and the user plane gateway is a low speed link, and a link between the user plane gateway and a network element using the IP transfer mode is a high speed link.

Preferably, the network element using the asynchronous transfer mode is node B, and the network element using the IP transfer mode is a radio network controller.

Preferably, the network element using the asynchronous transfer mode is a radio network controller, and the network element using the IP transfer mode is a Serving GPRS (General Pack Radio Service) Support Node.

A method for forwarding user plane data is provided according to another aspect of the present invention.

The method for forwarding user plane data according to the present invention comprises: a user plane gateway receiving data which comes from a first network element and using a first transfer mode; converting the transfer mode of the data from the first transfer mode to a second transfer mode, wherein the first transfer mode is asynchronous transfer mode and the second transfer mode is IP transfer mode, or the first transfer mode is IP transfer mode and the second transfer mode is asynchronous transfer mode; and sending the converted data to a second network element using the second transfer mode.

Preferably, a low speed link is set between a network element using the asynchronous transfer mode and the user plane gateway, and a high speed link is set between the user plane gateway and a network element using the IP transfer mode.

Preferably, the network element using the asynchronous transfer mode is node B, and the network element using the IP transfer mode is a radio network controller.

Preferably, the network element using the asynchronous transfer mode is a radio network controller, and the network element using the IP transfer mode is a SGSN.

By virtue of the present invention, the problem that the network elements which have different transfer modes are unable to communicate with each other directly is solved by setting a user plane gateway between the network elements using different transfer modes to forward data, thus achieving the effects that the ATM network joins the IP network, the networking devices are able to be compatible forwardly, the utilization rate of the bandwidth is improved, the costs are saved, etc.

BRIEF DESCRIPTION OF THE DRAWINGS

The drawings, provided for further understanding of the present invention and forming a part of the specification, are used to explain the present invention together with embodiments of the present invention rather than to limit the present invention, wherein.

DETAILED DESCRIPTION OF THE EMBODIMENTS

Considering the problem in relevant art that the networking elements which use different transfer modes are unable to communicate with each other directly and the utilization rate of transmission resources is relatively low and the costs of networking are rather high caused by the conventional point-to-point networking mode, in the UMTS network, there is needed an apparatus, system and method for forwarding user plane data so as to be compatible with the ATM transfer mode forwardly and support the evolution to IP backwardly. The embodiments of the present invention provides an apparatus, system and method for forwarding user plane data, in which by setting a user plane gateway between a first network element using ATM transfer mode and a second network element using IP transfer mode, the data which has ATM transfer mode and comes from a first network element is converted into data which has IP transfer mode and is sent to the second network element; and/or the data which has IP transfer mode and comes from the second network element is converted into data which has ATM transfer mode and is sent to the first network element. Therefore, the data can be forwarded among network elements which have different transfer modes, thus achieving the effects that the ATM network joins the IP network, the networking devices are able to be compatible forwardly, the utilization rate of the bandwidth is improved, and the costs are saved, etc.

The present invention will now be described in detail with reference to the accompanying drawings and in combination with embodiments in the following. It needs to note that the embodiments of the present application and the features in the embodiments can be combined with each other if there is no conflict.

A user plane gateway is provided according to the embodiments of the present invention. This user plane gateway includes: a receiving module 2, a converting module 4 and a sending module 6.

The receiving module 2 is used for receiving data which uses a first transfer mode and comes from a first network element; the converting module 4 connected to the receiving module 2 is used for converting the transfer mode of the data receiving by the receiving module 2 from the first transfer mode into a second transfer mode, wherein the first transfer mode is asynchronous transfer mode and the second transfer mode is IP transfer mode, or the first transfer mode is IP transfer mode and the second transfer mode is asynchronous transfer mode; and the sending module 6 connected to the converting module 4 is used for sending the data converted by the converting module 4 to a second network element which uses the second transfer mode.

In relevant art, the network elements which use different transfer modes are unable to communicate with each other directly. In the embodiments of the present invention, the converting module 4 can achieve data conversion between the asynchronous transfer mode and the IP transfer mode, thus ensuring the communication among the network elements.

Preferably, a link between a network element using the asynchronous transfer mode and the user plane gateway is a low speed link, and a link between the user plane gateway and a network element using the IP transfer mode is a high speed link.

Preferably, the network element using the asynchronous transfer mode is node B, and the network element using the IP transfer mode is a radio network controller.

Preferably, the network element using the asynchronous transfer mode is a radio network controller, and the network element using the IP transfer mode is a SGSN.

Figure 1:
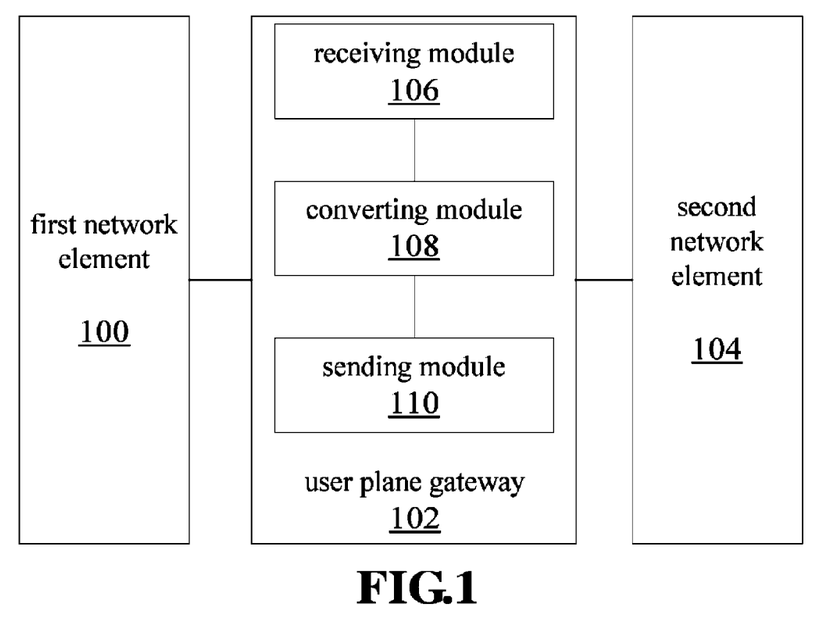
FIG. 1 is a structural block diagram of a system for forwarding user plane data according to the embodiments of the present invention.

A system for forwarding user plane data applied in the UMTS network is provided according to the embodiments of the present invention. FIG. 1 is a structural block diagram of a system for forwarding user plane data according to the embodiments of the present invention. As shown in FIG. 1, this system comprises a first network element 100 and a second network element 104, wherein the first network element 100 uses a first transfer mode while the second network element 104 uses a second transfer mode. This data forwarding system further comprises a user plane gateway 102, wherein the user plane gateway 102 includes: a receiving module 106, a converting module 108, and a sending module 110. The above structure will now be described in the following.

The receiving module 106 is used for receiving data from the first network element 100; the converting module 108 connected to the receiving module 106 is used for converting the transfer mode of the data received by the receiving module 106 from the first transfer mode to a second transfer mode, wherein the first transfer mode is asynchronous transfer mode and the second transfer mode is IP transfer mode; or the first transfer mode is IP transfer mode and the second transfer mode is asynchronous transfer mode; and the sending module 110 connected to the converting module 108 is used for sending to the second network element 102 the data converted by the converting module 108.

System Embodiment I

Figure 2:
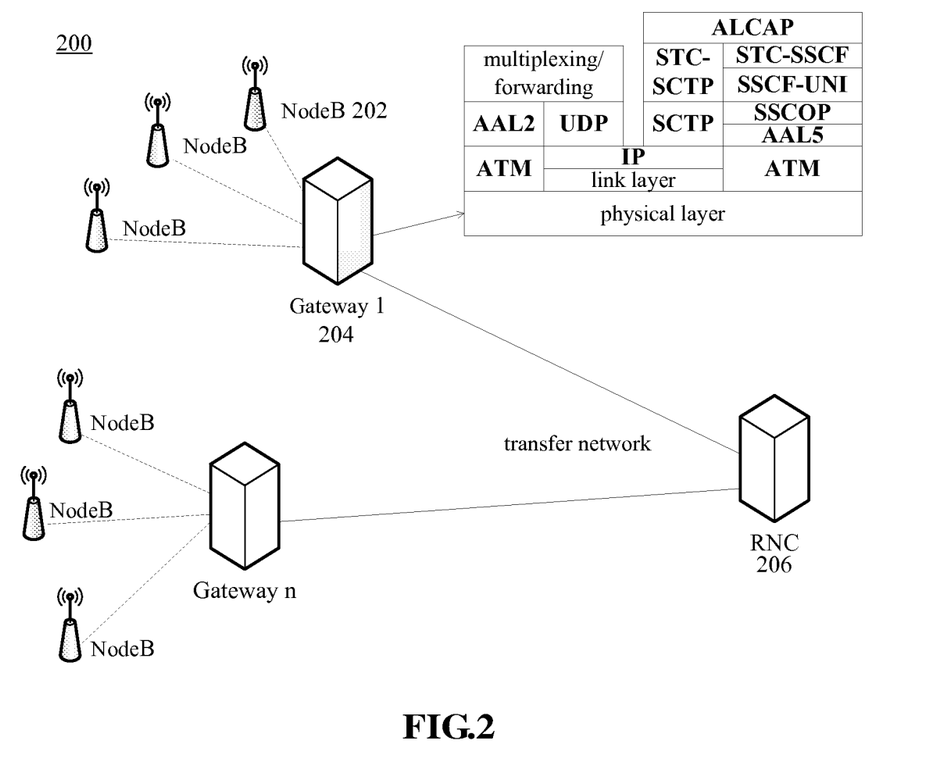
FIG. 2 is a schematic diagram of a first embodiment of the system for forwarding user plane data shown in FIG. 1.

FIG. 2 is a schematic diagram of a first embodiment of the system for forwarding user plane data shown in FIG. 1. As shown in FIG. 2, a data forwarding system 200 used in the UMTS is provided according to the embodiments of the present invention. This data forwarding system 200 comprises a Node B 202 as a first network element and a RNC 206 as a second network element, wherein the Node B 202 uses ATM transfer mode and the RNC 206 uses IP transfer mode. In addition, this data forwarding system 200 further comprises a user plane gateway 204, which user plane gateway 204 communicates with the Node B 202 using the ATM transfer mode and communicates with the RNC 206 using the IP transfer mode so as to convert the data which has ATM transfer mode and comes from the Node B 202 into the data which has IP transfer mode, and then forwards it to the RNC 206, and/or convert the data which has IP transfer mode and comes from the RNC 206 to the data which has ATM transfer mode and then forwards it to the Node B 202. The particular uplink/downlink process procedure of the user plane gateway 204 will be described in the following method embodiment I.

Optionally, the link between the user plane gateway 204 and the Node B 202 is a low speed link or a link group, and a high speed link is used between the user plane gateway 204 and the RNC 206. The user plane gateway 204 can support interfaces such as POS, FE, GE (Gigabit Ethernet), IMA, STM-1, STM-4, etc., and support the Node B 202 and RNC 206 which are accessed via different transfer networks, and also support RNC 206 and Node B 202 with different service traffics.

In this system for forwarding user plane data, a plurality of Nodes B with relatively short distance aggregate into one gateway via a low speed link and a plurality of gateways aggregate into one RNC via a high speed link, wherein the sum of the transfer bandwidths of all the Nodes B connected to one gateway can be greater than the bandwidth between the gateway and RNC. Thus, the multiplexing of link levels can be achieved by a high speed link statistically multiplexing a plurality of low speed links.

Furthermore, in the situation that the congestion rate of the networks are the same, when the bandwidth requirements are planned using the Erlang B formula, the total bandwidth requirement after the aggregation of a plurality of Nodes B is less than the sum of the requirements calculated for each single Node B respectively. In addition, there is a redundancy coefficient when planning the bandwidth requirements of the Node B, however, the total redundant bandwidth requirement after the aggregation of a plurality of Nodes B is less than the sum of the redundancies calculated for individual Nodes B respectively. Based on the above two characteristics, the system for forwarding user plane data according to the embodiments of the present invention achieves the multiplexing of transfer bandwidth, for example, the gateway can multiplex the user data of all home Nodes B so as to save header overhead and tail filling, thus achieving the multiplexing of service level. Thus, the utilization rate of bandwidth is improved by the multiplexing of link level and multiplexing of service level.

In addition, since the fee of low speed link group under the same bandwidth is far higher than that of one high speed link, the networking costs of the system for forwarding user plane data according to the embodiments of the present invention are far lower than those of the point-to-point networking mode by the Node B directly connected to the RNC under the same bandwidth.

System Embodiment II

Figure 3:
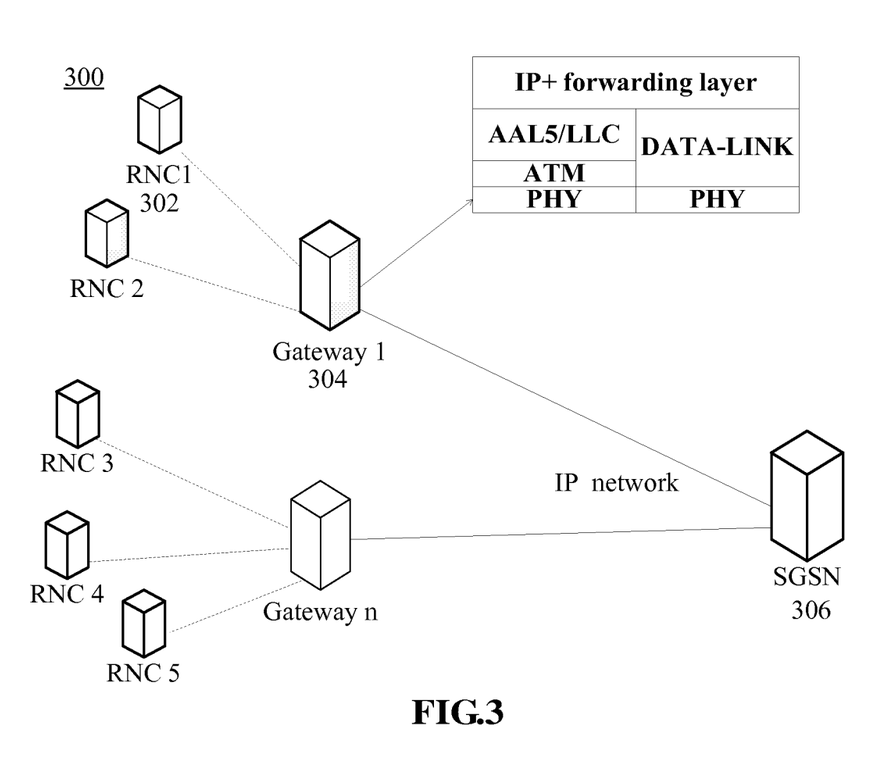
FIG. 3 is a schematic diagram of a second embodiment of the system for forwarding user plane data shown in FIG. 1.

FIG. 3 is a schematic diagram of a second embodiment of the system for forwarding user plane data shown in FIG. 1. As shown in FIG. 3, another system 300 for forwarding user plane data applied in the UMTS network is provided according to another embodiment of the present invention, which system comprises a RNC 302 as a first network element and a SGSN (Serving GPRS Support Node) 306 as a second network element, wherein the RNC 302 uses ATM transfer mode and the SGSN 306 uses IP transfer mode. In addition, this data forwarding system 300 further comprises a user plane gateway 304, which user plane gateway 304 communicates with the RNC 302 using the ATM transfer mode and communicates with the SGSN 306 using the IP transfer mode so as to convert the data which has ATM transfer mode and comes from the RNC 302 into the data which has IP transfer mode and then forwards it to the SGSN 306 and/or convert the data which has IP transfer mode and comes from the SGSN 306 into the data which has ATM transfer mode and then forwards it to the RNC 302. The particular uplink/downlink process procedure of the user plane gateway 304 will be described in method embodiment II hereinafter.

Optionally, the link between the user plane gateway 304 and RNC 302 is a low speed link or a link group, and a high speed link is used between the user plane gateway 304 and SGSN 306.

In this system, a plurality of RNCs with relatively short distance aggregate into one gateway via a low speed link, while a plurality of gateways aggregate into one SGSN via a high speed link, wherein the sum of the transfer bandwidths of all the RNCs connected to one gateway is greater than the bandwidth between the gateway and SGSN. Thus, the multiplexing of link level can be achieved by a high speed link statistically multiplexing a plurality of low speed links.

Furthermore, in the situation that the congestion rate of the network is the same, when the bandwidth requirements are planned using Erlang B formula, the total bandwidth requirement after the aggregation of a plurality of RNCs are less than the sum of the requirements calculated for each single RNC respectively. In addition, there is a redundancy coefficient when planning RNC bandwidth requirements, while the total redundant bandwidth requirements after the aggregation of a plurality of RNCs are less than the sum of the redundancy calculated for individual RNCs respectively. Based on the above two characteristics, the system for forwarding user plane data according to the embodiments of the present invention achieves the multiplexing of transfer bandwidth, for example, the gateway can multiplex the user data of all the home RNCs, and furthermore IP transfer has reduced header overhead as compared to ATM transfer. Thus, the utilization rate of bandwidth is improved by the multiplexing of link level and the reduction of header overhead.

In addition, since the fee of a low speed link group is far higher than one high speed link under the same bandwidth, the networking costs of the system for forwarding user plane data according to the embodiments of the present invention are far lower than those of the point-to-point networking mode of RNC directly connected to SGSN under the same bandwidth.

Those skilled in the art should appreciate that the data forwarding system described above is only an exemplary structure of the present invention, however, the present invention is not limited to this. For example, the above system for forwarding user plane data also can be such a system as follows: that is, it comprises a RNC which uses ATM transfer mode and an MGW (media gateway) which uses IP transfer mode and a user plane gateway provided between the RNC and MGW, wherein this user plane gateway communicate with the RNC using ATM transfer mode and communicates with the MGW using IP transfer mode so as to forward data between the RNC and the MGW.

A method for forwarding user plane data applied in the UMTS network is provided according to the embodiments of the present invention, which method comprises: a user plane gateway receiving data which uses a first transfer mode and comes from a first network element; converting the transfer mode of the data from the first transfer mode to a second transfer mode, wherein the first transfer mode is asynchronous transfer mode and the second transfer mode is IP transfer mode, or the first transfer mode is IP transfer mode and the second transfer mode is asynchronous transfer mode; and sending the converted data to a second network element which uses the second transfer mode.

The implementation process of the present invention will now be described in detail with two embodiments in the following.

Method Embodiment I

Figure 4:
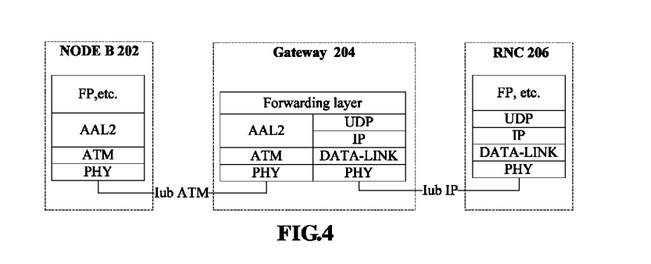
FIG. 4 is a schematic diagram of an interface protocol stack of a user plane gateway in FIG. 2.

FIG. 4 is a schematic diagram of an interface protocol stack of a user plane gateway in FIG. 2. As shown in FIG. 4, a method for forwarding user plane data is provided according to the embodiments of the present invention, wherein a Node B 202 as a first network element uses ATM transfer mode and a RNC 206 as a second network element uses IP transfer mode. This data forwarding method comprises: a user plane gateway 204 receiving data which has ATM transfer mode and comes from the Node B 202, converting the ATM transfer mode of the received data into IP transfer mode, and forwarding the converted data to the RNC 206; and/or the user plane gateway 204 receiving data which has IP transfer mode and comes from the RNC 206, converting the IP transfer mode of the received data into ATM transfer mode, and forwarding the converted data to the Node B 202.

Figure 6:
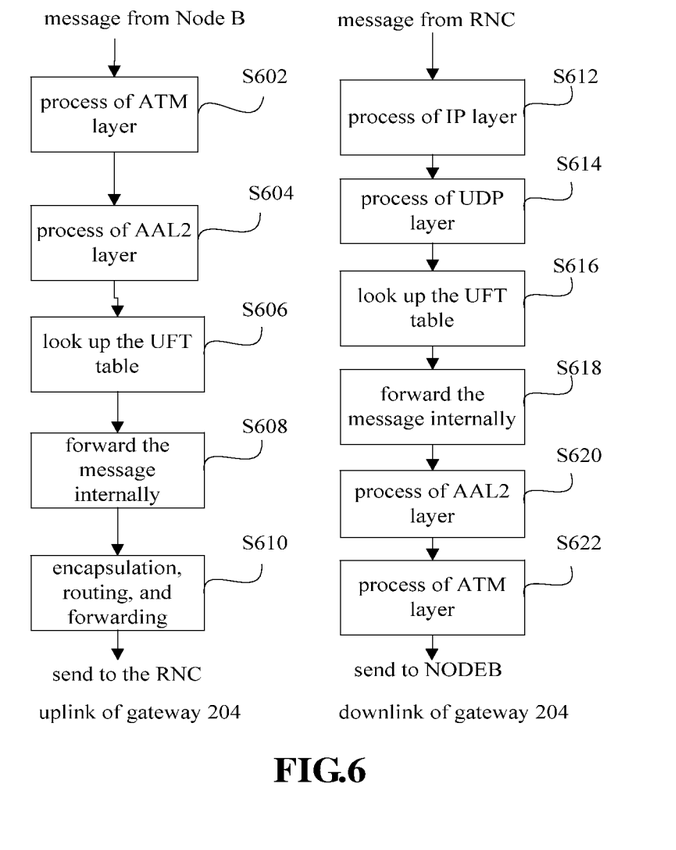
FIG. 6 is a flowchart of uplink/downlink process of the user plane gateway in FIG. 2.

FIG. 6 is a flow chart of uplink/downlink process of the user plane gateway 204 in FIG. 2. This particular method for forwarding user plane data will be described in detail with an IUB interface as the example and in conjunction with FIGS. 2, 4 and 6 in the following. In order to simplify the description of this method for forwarding user plane data, definition is made as follows:

1) AAL2→IP direction is uplink direction (Node B→gateway→RNC);
2) IP→AAL2 direction is downlink direction (RNC→gateway→Node B);
3) the definition of PHY/ATM/AAL2 processing entity is as follows: G-A-IUB (GATEWAY_ATM_IUB), there can be a plurality of such entities in the gateway;
4) the definition of IUB forwarding layer processing entity is: G-F-IUB (GATEWAY_FORWARD_IUB), there is only one such entity in the gateway;
5) the definition of PHY/DATALINK (data connection)/IP/UDP processing entity is as follows: G-I-IUB (GATEWAY_IP_IUB), there can be a plurality of such entities in the gateway.

The particular process procedure of this method for forwarding user plane data is achieved on the basis of the situation in which during a call, the ALCAP of the IUB interface gateway establishes a user channel with the Node B 202 and RNC 206 respectively in advance, and the IUB interface gateway establishes a mapping table for each user channel, which is abbreviated as user forwarding table UFT (USER FORWARD TABLE), and the entry contents of this table are: (PORT+VPI+VCI+CID)←→(IP+UDP PORT), wherein VPI is virtual path identifier, VCI is virtual connection identifier, and CID is channel ID, and in addition, (PORT+VPI+VCI) identifies a virtual link and (PORT+VPI+VCI+CID) identifies one user on the link.

As shown in FIG. 6, the process procedure of the user plane gateway 204 in the uplink direction includes:

Step S602: the G-A-IUB receives a message (i.e. data which has ATM transfer mode) from the network element, Node B 202, and the ATM layer processes this message, records the PORT, VPI, and VCI information, and forwards the PORT, VPI, and VCI information together with the message to the AAL2 layer to have them processed;

Step S604: the AAL2 layer of G-A-IUB reorganizes the ATM payload, de-multiplexes it into AAL2 SDU, records CID information, and then forwards the CID information together with the PORT, VPI, and VCI information and the message to G-F-IUB to have them processed;

Step S606: G-F-IUB looks up the UFT according to the PORT, VPI, VCI and CID information obtained by steps S602 and S604 to acquire the destination IP address and UDP destination port;

Step S608: G-F-IUB acquires according to the destination IP address and the UDP port a processing entity G-I-IUB which processes this user and forwards the message to this G-I-IUB; and Step S610: G-I-IUB receives the message from G-F-IUB, encapsulates the message using the destination IP address and UDP destination port to obtain data which has IP transfer mode, and searches a route according to the destination IP and finally sends it to the network element RNC 206 via a bottom interface.

In addition, the process procedure of the user plane gateway 204 in the downlink direction includes:

Step S612: G-I-IUB receives a message (i.e. data which has IP transfer mode) from the network element RNC 206 and forwards this message to the IP layer, and the IP layer of G-I-IUB records the destination IP address and forwards this destination IP address together with the message to the UDP layer to have them processed;

Step S614: the UDP layer of G-I-IUB parses the message header to acquire the UDP destination port and forwards this UDP destination port together with the destination IP address and the message to G-F-IUB to have them processed;

Step S616: G-F-IUB looks up the UFT according to the destination IP address and UDP destination port obtained by steps S612 and S614 to obtain the PORT, VPI, VCI and CID information;

Step S618: G-F-IUB acquires according to the PORT, VPI, and VCI information a processing entity G-A-IUB which processes this link, and forwards the message to G-A-IUB;

Step S620: G-A-IUB receives a message from G-F-IUB and uses CID to encapsulate and multiplex CPS Packet, and segment it to an ATM CELL payload, and then forwards it to the ATM layer; and Step S622: the ATM layer performs VPI and VCI encapsulation on the message to obtain data which has ATM transfer mode, and then forwards it to the physical layer, and finally sends it to the Node B 202 via a port identified by PORT.

Method Embodiment II

Figure 5:
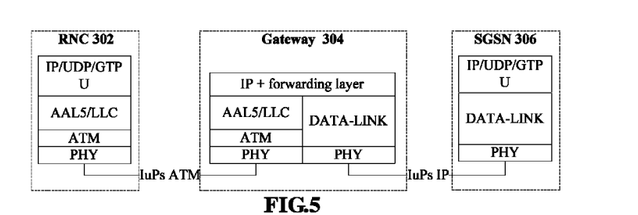
FIG. 5 is a schematic diagram of an interface protocol stack of a user plane gateway in FIG. 3.

FIG. 5 is a schematic diagram of an interface protocol stack of the user plane gateway in FIG. 3. As shown in FIG. 5, another method for forwarding user plane data is provided according to the embodiments of the present invention, wherein a RNC 302 as a first network element uses ATM transfer mode and a SGSN 306 as a second network element uses IP transfer mode. This method for forwarding user plane data comprises: a user plane gateway 304 receives data which has ATM transfer mode and comes from the RNC 302, converts the ATM transfer mode of the received data to IP transfer mode, and forwards the converted data to the SGSN 306; and/or the user plane gateway 304 receives data which has IP transfer mode and comes from the SGSN 306, converts the IP transfer mode of the received data to ATM transfer mode, and forwards the converted data to the RNC 302.

Figure 7:
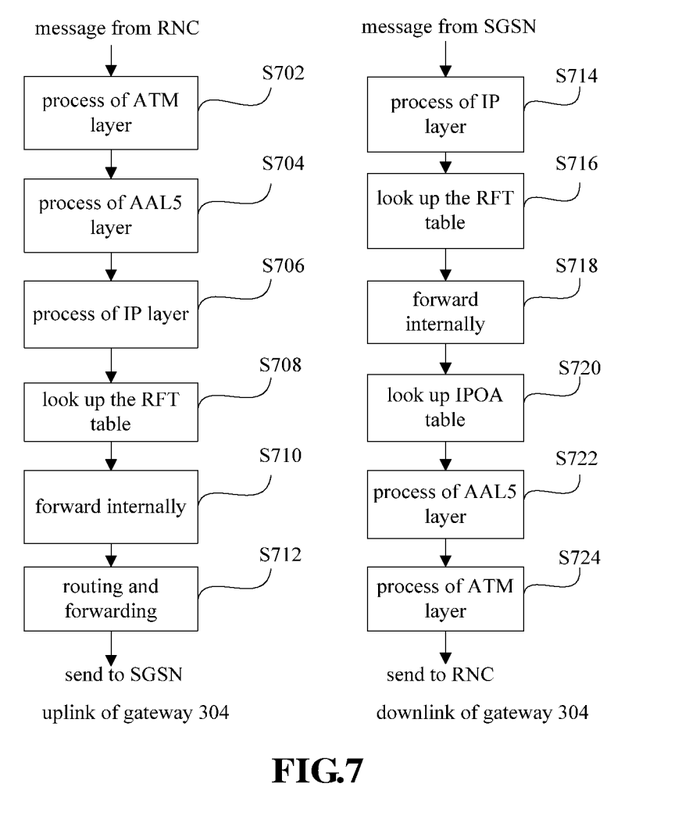
FIG. 7 is a flowchart of uplink/downlink process of the user plane gateway in FIG. 3.

FIG. 7 is a flow chart of the uplink/downlink process of the user plane gateway 304 in FIG. 3. This particular method for forwarding user plane data will now be described in detail in conjunction with FIGS. 3, 5 and 7, with an IUPS interface as the example. In order to simplify the description on this method for forwarding user plane data, the definition is made as follows:
1) AAL5→IP direction is uplink direction (RNC→gateway→SGSN);
2) IP→AAL5 direction is downlink direction (SGSN→gateway→RNC);
3) the definition of PHY/ATM/AAL5 processing entity is: G-A-IUPS (GATEWAY_ATM_IUPS), there can be a plurality of such entities in the gateway;
4) the definition of PHY/DATALINK/IP processing entity is: G-I-IUPS (GATEWAY_IP_IUPS), there can be a plurality of such entities in the gateway;
5) the definition of IUPS forwarding layer processing is: G-F-IUPS (GATEWAY_FORWARD_IUPS), there is only one such entity in the gateway.

The particular process procedure of this method for forwarding user plane data is achieved on the basis of the situation: configuring the home relation, static routing, etc. of RNC and SGSN, or generating a route forward table (abbreviated as RFT table) between the RNC and SGSN via the dynamic routing protocol, which table records the mapping relation as follows: destination address+subnet mask→next hop address, and furthermore, it is further needed to configure an IPOA (IP over ATM) table, which records the mapping relation as follows: (IP address)←→PORT+VPI+VCI.

As shown in FIG. 7, the process procedure of the user plane gateway 304 in the uplink direction includes:
Step S702: G-A-IUPS receives a message (i.e. data which has ATM transfer mode) from the network element RNC 302, the physical layer records the ATM port number, the ATM layer records the VPI and VCI information, and forwards the VPI and VCI information together with the message to the AAL5 layer to have them processed;

Step S704: the AAL5 layer of G-A-IUPS reorganizes the ATM payload, performs the process of the AAL5 layer, parses the SNAP header, and forwards the payload to the IP layer to have it processed;

Step S706: the IP layer of G-A-IUPS performs IP-related process, records the destination IP address IPA1, and forwards it to G-F-IUPS to have it processed;

Step S708: G-F-IUPS looks up according to IPA1 the RFT table to acquire next hop address IPA2;

Step S710: G-F-IUPS acquires the G-I-IUPS processing entity according to the next address IPA2 and forwards the message to G-I-IUPS;

Step S712: after receiving the uplink message, G-I-IUPS routes and forwards the IP message (i.e. data which has IP transfer mode), selects a physical port to forward it to a bottom link, and finally sends it to the network element SGSN 306.

In addition, the process procedure of the user plane gateway 304 in the downlink direction includes:
Step S714: G-I-IUPS receives a message (i.e. data which has IP transfer mode) from the network element SGSN 306, the IP layer records the IP address IPA3 after performing relevant process, and forwards it to G-F-IUPS to have it processed;

Step S716: G-F-IUPS looks up according to IPA3 the RFT table to acquire next hop address IPA 4;

Step 718: G-F-IUPS acquires the G-A-IUPS processing entity according to IPA 4 and forwards the message to G-A-IUPS;

Step S720: After receiving the message, G-A-IUPS looks up the IPOA table according to IPA4 so as to acquire PORT, VPI, and VCI information, and forwards the PORT, VPI, and VCI information together with the message to the AAL5/LLC/SNAP layer;

Step S722: the AAL5/LLC/SNAP layer slices the message into ATM payload and forwards it to the ATM layer;

Step S724: the ATM layer acquires VPI+VCI according to step S720 and performs ATM header encapsulation (i.e. data which has ATM transfer mode), and finally forwards it to the network element RNC 302 via a port identified as PORT.

Those skilled in the art can understand that the transfer mode of one end of the user plane gateways 204 and 304 is ATM transfer mode, and the transfer mode of the other end is IP transfer mode, which is only an exemplary structure of the present invention, and the present invention is not limited to this. For example, the user plane gateway 204 can also be embodied in the way that both ends of the gateway are IP/UDP carrier, and the forwarding procedure uses (IP+UDP PORT)←→(IP+UDP PORT) to achieve the forwarding, multiplexing, aggregation, etc. of the user messages between Node B and RNC.

In summary, by virtue of the embodiments of the present invention, since a gateway is provided between the network elements in ATM transfer mode and the network element in IP transfer mode, which gateway communicates with each network element using corresponding transfer modes so as to forward data between individual network elements, thus the existing device does not need to be replaced when evolving into the all-IP network, that is, the new networking devices with IP transfer mode are capable of being compatible with the existing networking devices with ATM transfer mode forwardly. For example, with the system and method for forwarding user plane data according to the embodiments of the present invention, when the UTRAN has completely transited to all-IP, the existing Node B still uses ATM/AAL2←→IP+UDP conversion, and the newly accessed Node B uses IP+UDP←→IP+UDP so as to directly access the gateway, thus, it is not required for the operators to replace the existing devices (including Node B, RNC, and gateway) and at most there is a need to extend capacity, which sufficiently protects the investment of the operators. This is also an economic transition mode of UTRAN from ATM to all-IP.

In addition, since the system and method for forwarding user plane data according to the embodiments of the present invention achieve multiplexing of link level and service level, it greatly saves the overhead of the transfer network and improves the utilization rate of the bandwidth. Moreover, under the condition of the same bandwidth, the networking costs of the system for forwarding user plane data which has a user plane gateway according to the embodiments of the present invention are far lower than those of the point-to-point networking mode of Node B directly connected to RNC or the point-to-point networking mode of RNC directly connected to SGSN.

It should be noted that the steps shown in the flow charts of the accompanying drawings can be performed in a computer system such as a set of computer executable instructions. Although the logical order is shown in the flow charts, the steps shown or described can be performed in an order different from the one shown herein in certain situations.

Obviously, it should be understood by those skilled in the art that, the above various modules or steps of the present invention may be implemented by use of a universal computing device; they may be centralized at a single computing device or distributed at the network composed of multiple computing devices; alternatively, they may be implemented by an executable program code of computing device, therefore which may be stored in a storage device and executed by a computing device, or which may be respectively formed as various integrated circuit modules, or multiple modules or steps of which may be formed as single integrated circuit module. Therefore, the present invention is not limited to any specific combination of hardware and software.

The foregoing is only preferred embodiments of the present invention and is not for use in limiting the protection scope thereof, and for those skilled in the art, there may be various modifications and changes to the present invention. Any modification, equivalent replacement and improvement made under the spirit and principle of the present invention should be included in the protection scope thereof.

What is claimed is:

1. A user plane gateway applicable in the universal mobile telecommunication system network comprises:
   a receiving module, configured to receive data which comes from a first network element and uses a first transfer mode;
   a converting module, configured to convert the transfer mode of the data from the first transfer mode to a second transfer mode, wherein the first transfer mode is asynchronous transfer mode and the second transfer mode is IP transfer mode, or the first transfer mode is IP transfer mode and the second transfer mode is asynchronous transfer mode; and
   a sending module, configured to send the converted data to a second network element using the second transfer mode;
   wherein the network element using the asynchronous transfer mode is a Node B, and the network element using the IP transfer mode is a Radio Network Controller (RNC); or
   the network element using the asynchronous transfer mode is an RNC, and the network element using the IP transfer mode is a Serving GPRS Support Node (SGSN).

2. The user plane gateway according to claim 1, wherein a link between the network element using the asynchronous transfer mode and the user plane gateway is a low speed link, and a link between the user plane gateway and the network element using the IP transfer mode is a high speed link.

3. A system for forwarding user plane data applicable in the universal mobile telecommunication system network, comprising a first network element and a second network element, wherein the first network element uses a first transfer mode and the second network element uses a second transfer mode, the system for forwarding user plane data further comprises a user plane gateway, wherein the user plane gateway comprises:
   a first receiving module, configured to receive data from the first network element;
   a converting module, configured to convert the transfer mode of the data from the first transfer mode to the second transfer mode, wherein the first transfer mode is asynchronous transfer mode and the second transfer mode is IP transfer mode; or the first transfer mode is IP transfer mode and the second transfer mode is asynchronous transfer mode; and
   a sending module, configured to send the converted data to the second network element;
   wherein the network element using the asynchronous transfer mode is a Node B, and the network element using the IP transfer mode is a Radio Network Controller (RNC); or
   the network element using the asynchronous transfer mode is an RNC, and the network element using the IP transfer mode is a Serving GPRS Support Node (SGSN).

4. The system according to claim 3, wherein a link between the network element using the asynchronous transfer mode and the user plane gateway is a low speed link, and a link between the user plane gateway and the network element using the IP transfer mode is a high speed link.

5. A method for forwarding user plane data applicable in the universal mobile telecommunication system network comprising:
   a user plane gateway receiving data which comes from a first network element and uses a first transfer mode;
   converting the transfer mode of the data from the first transfer mode to a second transfer mode, wherein the first transfer mode is asynchronous transfer mode and the second transfer mode is IP transfer mode, or the first transfer mode is IP transfer mode and the second transfer mode is asynchronous transfer mode; and
   sending the converted data to a second network element using the second transfer mode;
   wherein the network element using the asynchronous transfer mode is a Node B, and the network element using the IP transfer mode is a Radio Network Controller (RNC); or
   the network element using the asynchronous transfer mode is an RNC, and the network element using the IP transfer mode is a Serving GPRS Support Node (SGSN).

6. The system according to claim 5, wherein a low speed link is set between the network element using the asynchronous transfer mode and the user plane gateway, and a high speed link is set between the user plane gateway and a network element using the IP transfer mode.

* * * * *